US005829002A

United States Patent [19]

Priest

[11] Patent Number: 5,829,002

[45] **Date of Patent: *Oct. 27, 1998**

[54] SYSTEM FOR COORDINATING INFORMATION TRANSFER AND RETRIEVAL

[76] Inventor: W. Curtiss Priest, 19 Diana La., Lexington, Mass. 02173

[ * ] Notice: The term of this patent shall not extend beyond the expiration date of Pat. No. 5,167,011.

[21] Appl. No.: 816,206

[22] Filed: Dec. 8, 1995

Related U.S. Application Data

[63] Continuation of Ser. No. 979,527, Nov. 23, 1992, abandoned, which is a continuation-in-part of Ser. No. 311,230, Feb. 15, 1989, Pat. No. 5,167,011.

[51] Int. Cl.[6] .................... G06F 17/30

[52] U.S. Cl. .................... 707/10

[58] Field of Search .................... 707/10; 395/200.31

[56] References Cited

U.S. PATENT DOCUMENTS

| | | | |
|---|---|---|---|
| 3,585,597 | 6/1971 | Holmerud | 707/3 |
| 3,676,851 | 7/1972 | Eastman | 395/182.04 |
| 3,774,163 | 11/1973 | Recoque | 395/673 |
| 3,995,254 | 11/1976 | Rosenbaum | 382/231 |
| 4,003,029 | 1/1977 | Nilho | 707/3 |
| 4,068,295 | 1/1978 | Portmann | 363/60 |
| 4,068,298 | 1/1978 | Dechant et al. | 707/3 |
| 4,123,964 | 11/1978 | Strauff | 91/434 |
| 4,139,901 | 2/1979 | Ganske et al. | 707/200 |
| 4,161,025 | 7/1979 | Dahy et al. | 395/309 |
| 4,186,438 | 1/1980 | Benson et al. | 711/113 |
| 4,267,568 | 5/1981 | Dechant et al. | 707/1 |

(List continued on next page.)

OTHER PUBLICATIONS

Thomas W. Malone et al, "*Intelligent Information–Sharing Systems*", ACM, May 1987, vol. 30 No. 5.

Thomas W. Malone et al, "*Semistructured Messages Are Surprisingly Useful for Computer–Supported Coordination,*" ACM Transactions on Office Information Systems, vol. 5, No. 2, Apr. 1987, pp. 115–131.

Kum–Yew Lai, Master's Degree Thesis, "Essays on Object Lens, A tool for Supporting Information–Sharing", M.I.T. Sloan School of Management, submitted Aug. 22, 1987.

Stephen Pollock, "A Rule–Based Message Filtering System", ACM Transactions on Office Information Systems, vol. 6, No. 3, Jul. 1988, pp. 232–254.

Kum–Yew Lai, Thomas W. Malone, "*Object Lens: A Spreadsheet for Cooperative Work*" ACM Transactions on Office Information Systems, vol. 6, No. 4, Oct. 1988, pp. 332–353.

Kevin Crowston, Thomas W. Malone, "Intelligent Software Agents", Byte Magazine, Dec. 1988, pp. 267 et seq.

Article, EDventure Holdings, Inc., dated 24 Sep. 1986 (no author shown), describing the "Information Lens" system.

Article, EDventure Holdings, Inc., dated 22 Sep. 1988 (no author shown) describing the Object Lens system, which includes the capability of creating data structures, handling messages and executing rules.

*Primary Examiner*—Thomas G. Black
*Assistant Examiner*—Jack M. Choules
*Attorney, Agent, or Firm*—Corbin Gittes & Samuel

[57] ABSTRACT

A system for coordinating information transfer, storage and retrieval between and among local processors in a group utilizes a controlled vocabulary of terms which can be modified by various ones of the processors in the group. The controlled vocabulary is utilized in connection with group and local processor functions of storage/retrieval, telecommunications and decision support. The controlled vocabulary can be modified or updated by a remote user by way of a communications channel.

4 Claims, 15 Drawing Sheets

U.S. PATENT DOCUMENTS

| | | | |
|---|---|---|---|
| 4,276,597 | 6/1981 | Disaly et al. | 707/1 |
| 4,318,184 | 3/1982 | Millett et al. | 707/1 |
| 4,346,442 | 8/1982 | Musmanno | 705/36 |
| 4,357,679 | 11/1982 | Avsan et al. | 395/581 |
| 4,357,680 | 11/1982 | Greek, Jr. et al. | 707/539 |
| 4,358,824 | 11/1982 | Glickman et al. | 707/5 |
| 4,384,325 | 5/1983 | Slechta, Jr. et al. | 707/3 |
| 4,422,158 | 12/1983 | Gallo | 707/5 |
| 4,468,728 | 8/1984 | Wang | 707/1 |
| 4,506,326 | 3/1985 | Shaw et al. | 707/4 |
| 4,542,477 | 9/1985 | Noyori et al. | 704/7 |
| 4,566,065 | 1/1986 | Toth | 704/251 |
| 4,587,633 | 5/1986 | Wang et al. | 395/200.64 |
| 4,591,983 | 5/1986 | Bennett et al. | 395/464 |
| 4,595,982 | 6/1986 | Burt | 395/51 |
| 4,611,298 | 9/1986 | Schuldt | 707/531 |
| 4,620,295 | 10/1986 | Alken, Jr. | 707/531 |
| 4,621,319 | 11/1986 | Braun et al. | 395/183.22 |
| 4,630,234 | 12/1986 | Holly | 707/3 |
| 4,630,235 | 12/1986 | Hashimoto et al. | 704/4 |
| 4,631,664 | 12/1986 | Bachman | 707/100 |
| 4,633,391 | 12/1986 | Rundell | 704/7 |
| 4,633,393 | 12/1986 | Rundell | 707/7 |
| 4,635,189 | 1/1987 | Kandall | 707/10 |
| 4,644,461 | 2/1987 | Jennings | 395/676 |
| 4,648,037 | 3/1987 | Valentino | 395/10 |
| 4,658,370 | 4/1987 | Erman et al. | 395/76 |
| 4,660,188 | 4/1987 | Hoffeld | 395/24 |
| 4,674,060 | 6/1987 | Larkin et al. | 364/567 |
| 4,675,803 | 6/1987 | Kendall et al. | 364/131 |
| 4,710,763 | 12/1987 | Franke et al. | 345/10 |
| 4,710,868 | 12/1987 | Cocke et al. | 395/311 |
| 4,713,754 | 12/1987 | Agarwal et al. | 707/100 |
| 4,734,856 | 3/1988 | Davis | 395/10 |
| 4,752,890 | 6/1988 | Natarajan et al. | 395/68 |
| 4,763,296 | 8/1988 | Gercekci | 395/185.08 |
| 4,764,807 | 8/1988 | Kimura et al. | 358/507 |
| 4,764,867 | 8/1988 | Hess | 345/356 |
| 4,769,772 | 9/1988 | Dwyer | 707/2 |
| 4,774,661 | 9/1988 | Kumpat | 707/3 |
| 4,783,752 | 11/1988 | Kaplan et al. | 395/454 |
| 4,787,051 | 11/1988 | Olson | 345/179 |
| 4,788,643 | 11/1988 | Trippe et al. | 705/6 |
| 4,789,928 | 12/1988 | Fujlsaki | 705/37 |
| 4,791,561 | 12/1988 | Huber | 707/1 |
| 5,262,943 | 11/1993 | Thibadu et al. | 600/300 |
| 5,283,856 | 2/1994 | Gross et al. | 395/51 |
| 5,311,423 | 5/1994 | Clark | 705/8 |
| 5,345,380 | 9/1994 | Babson, III et al. | 364/400 |
| 5,347,653 | 9/1994 | Flynn et al. | 707/203 |

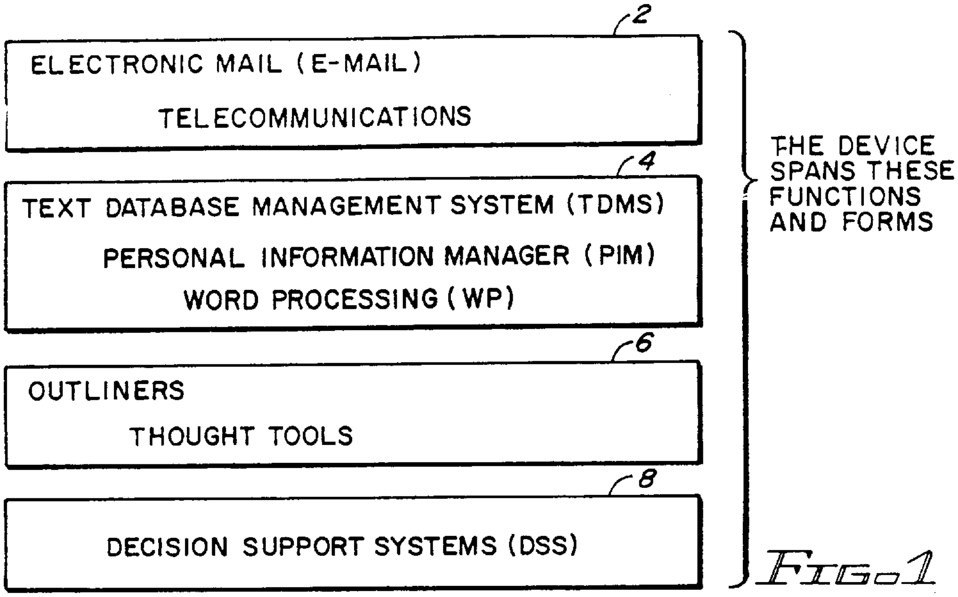
FIG. 1
FIG. 2
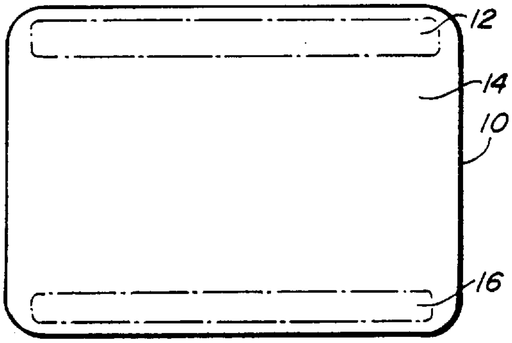
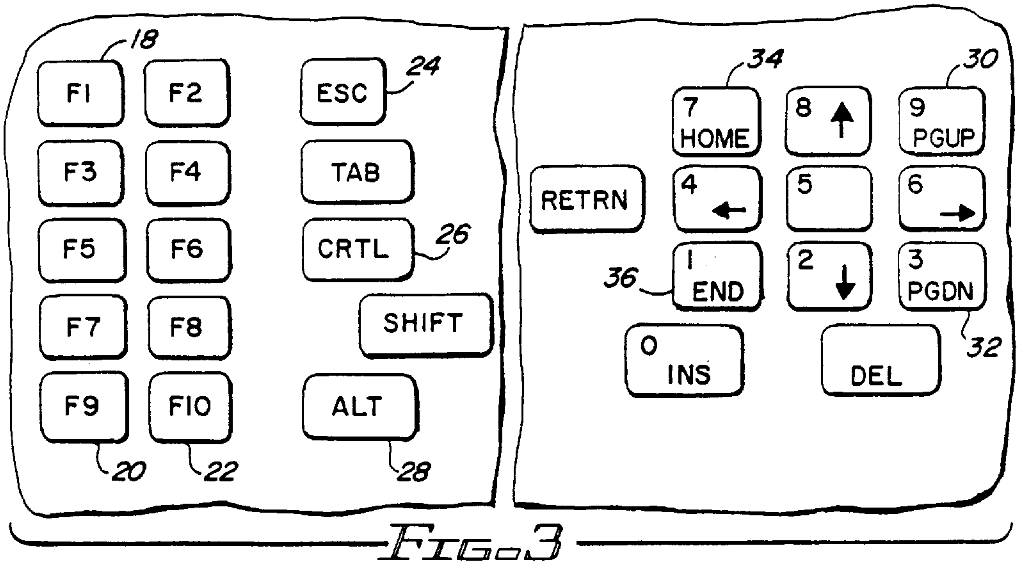
FIG. 3

SYSTEM FOR COORDINATING INFORMATION TRANSFER AND RETRIEVAL

This is a continuation of application Ser. No. 07/979,527, filed Nov. 23, 1992, now abandoned, which is in turn a continuation in part of application Ser. No. 07/311,230, filed Feb. 15, 1989 now Pat. No. 5,167,011.

BACKGROUND OF THE INVENTION

1. Field of the Invention

This invention relates to the interactive storage, retrieval, and communication of information, and more specifically to a design that unifies these activities using a controlled vocabulary and employs enhanced operator interfaces.

2. Description of the Related Art

In recent years the availability and use of information has been found to be critically important to industry, business, and other areas that are information intensive. With the advent of automated data processing equipment various forms of information storage and retrieval devices have been developed.

The scope of these devices is shown in FIG. 1 and the use of four planes in the figure is a graphical device to help illustrate differences among four groups of devices and to help relate these four groups to the disclosed invention. The diagonal thread through the four planes is used to suggest how the disclosed invention unifies these planes into a single device.

The top plane 2 is a group of devices that aid in the communication of information via telecommunications. Prior to the advent of desktop computers, electronic mail employed central computers and connections to computer terminals to send and receive information. more recently there have been a variety of configurations some which use central computers as store and forward devices and some where electronic mail and other transmissions occur from desktop to desktop. Curiously, some of the better devices to aid in the receipt and transmission of desktop information among standalone personal computers have come from shareware sources such as ProComm and QModem. Another development in recent years has been the Local Area Network (LAN) which has served to provide a coherent telecommunication channel among a group of personal computers, work stations, or the like. A common mode of operation for electronic mail is to move messages based on the identities of sending and receiving individuals much like the postal system. Another mode has been the electronic bulletin board where messages are posted under topics on a central computer. Still another form has taken the form of computer teleconferencing where the concept of the bulletin board is extended using topic structures and other enhancements.

The second plane in FIG. 1 depicts a group of devices that store text (and text related) information for retrieval and/or printing. Text database management systems have been developed for large mainframe computers such as the Dialog System by Lockheed (currently Knight Ridder) to personal computer based systems such as CITATION and Xyindex. These systems often operate with large inverted indexes of search words, often supplemented by controlled vocabularies sometimes called descriptors and in the case of the library of Medicine, called MESH headings. Word processors have evolved substantially beyond the typewriter to permit not only ease in text entry and editing but also the facilities to do desktop publishing where text and graphics are easily combined in camera ready output. Most recently, a form of text information organizing devices have been called Personal Information Managers (PIM) and these devices perform a variety of functions including accessing disparate text information on a personal computer and providing ways of organizing information by attaching keywords to blocks of text Examples of these include products called IZE, GRANDVIEW, and AGENDA.

The third plane depicts a group of devices called outliners or thought tools. These devices are for the most part computer-based outline facilities and gain their popularity by being able to turn on and turn off parts of the outline. A shareware product called PC Outline (PCO) has gained large usage on the IBM class of machines and ThinkTank has gained popularity on the Apple Macintosh class of machines. The main characteristic of these devices is the use of categories as an organizing approach to text and thinking.

The fourth plane depicts a group of devices called decision support tools or systems(DSS). There are a wide variety of approaches to providing decision support and brief summary is difficult. A common approach, however, is to take a problem requiring choices to be made and decompose the problem into a set of factors or components. This multifactoral approach to decision making is derived from management and marketing science. Personal computer based products of this style include DecisionMap, Lightyear, and Expert Choice.

The use of hierarchical structures to organize information has a long history. Taxonomies for library use have developed categories and subcategories for information and the filing of books. The use of graphical displays of such hierarchical structures for information retrieval includes products such as TOPIC (formerly RUBRIC). The use of graphical displays of hierarchical structures for depicting organizational structures include an early public domain product called ORGZ and a commercial product called ORG. The use of graphical displays of hierarchical structures for project management includes the Harvard Project Manager (now Software Publishing Corp.) and the use of such displays for decision trees has a long history with Texas Instruments (at Austin, Tex.). The use of graphical displays of hierarchical structures for decision support (of the multifactoral variety) include an early commercial product called DecisionMap and another product called Expert Choice. Further, the use of hierarchical structures and graphical display have a long history with disk based operating systems both on the Apple Macintosh and the IBM PC where these structures can be visually displayed and edited. Products include the Apple Finder, Norton's Utilities, and VTREE. The Apple Finder can be traced back to work done in graphical displays at the Xerox Research Facilities at Palo Alto in the mid 1970's.

While each of these devices and products have particular strengths and capabilities, none of them were designed as a unified, seamless system to store, retrieve, and communicate information in relation to task work. Thus while pieces of the disclosed invention can be found scattered among the related art. There is no system in its entirety like the disclosed invention.

SUMMARY OF THE INVENTION

By means of this invention there is provided an improved way to store, retrieve and communicate information. Central to the invention is the use of a controlled vocabulary (not necessarily fixed) to provide linkages to an information database, a telecommunication facility, and a decision support facility.

To aid in operation and ease of use, the preferred embodiment employs a graphically displayed controlled vocabulary hierarchy and convenient operator interface for displaying and editing the hierarchy and all related facilities. Migration among the layers of the device as depicted as four planes in FIG. 1 is intuitive and unifies the operator's perceptions of the linkages built around the controlled vocabulary.

While the current preferred embodiment employs a text and graphics database, other embodiments might include hypertext database facilities with voice, video disk, video tape, and other means of information storage and retrieval.

More specifically, the operator can guide the device to a particular item in the controlled vocabulary and use this particular place in the hierarchy to 1) define how information is stored and retrieved in the database, 2) define the context of information sent and received via telecommunications, and 3) determine the effect of the item as a factor in decision making relates to achieving a final outcome. It is this unifying function of the controlled vocabulary which provides a seamless environment to the operator in applications of information intensive tasks.

Further, using a network of said devices, the devices interlock using the same controlled vocabulary and become efficient and useful in aiding group work as a form of groupware. Information transferred between said devices require reduced cataloguing and mental effort since transfers are accompanied by context information derived from the controlled vocabulary. Non context storage, retrieval and communication is also supported by the device but is seen as a less efficient mode of operation.

DEFINITIONS AND TERMINOLOGY

The device relates to a number of subject areas including computer systems, telecommunications, computer databases, and decision support This section first describes terminology common to public discourse on these subjects and, second, describes terminology developed specifically to explain the device.

TERMINOLOGY COMMON TO PUBLIC DISCOURSE

Electronic-mail—the exchange of messages employing electronic means and often without resort to paper copies;

Telecommunications—the transmission of data, information and other forms of variety by means other than face-to-face voice communication;

Text Database Management System (TDMS)—a computer database including access and entry means for containing text, graphics and other "unstructured" information;

Personal Information Manager (PIM)—a computer-based means for providing access and entry to information, often tailored to the individual needs of the user;

Word Processing (WP)—a computer-based means for entering, revising, and printing text and related information with emphasis on paper output;

Outliners—a computer-based means for organizing categories and information that represent extensions of the written outline;

Thought Tools—computer-based means for aiding thinking that may include an Outliner and may include other aids that are derived from decision support expert systems, and artificial intelligence;

Decision Support Systems (DSS)—any of a large class of means to aid an individual or organization in making choices among alternatives in a way that improves the efficiency in achieving an outcome or set of outcomes;

Groupware—computer-aided group work

Hierarchies—a method for organizing information by assigning general terms and more specific terms under those general terms. Outlines and tree diagrams are forms of hierarchies. In library science, the general term is called the broader term (BT) and the more specific term is called the narrower term (NI).

Tree Diagram—a graphical display method that can be used to visually show a hierarchy where narrower terms are shown as branches (often with connecting lines) to a broader term and where each branch point in the tree is called a Node. Each set of branches under a particular node is called a Level.

Mutually Exclusive Hierarchies—a subset of hierarchies where branching is employed to consider a single branch of the hierarchy in a particular application.

Decision Tree—is a Tree Diagram that is used, not to display hierarchies of information but, to display possible events with associated probabilities of occurrence. Each branch thus represents distinctly different events such that one and only one branch represents the actual future and represents a form of a mutually exclusive hierarchy.

Model—a representation of an output in terms of one or more inputs (often referred to as factors).

Multivariate Analysis—a form of analysis and modeling where individual factors are related to an effect.

Geometric Averaging—a specific formulation for combining factors in multivariate analysis.

Controlled Vocabulary—a set of words, phrases, pictures or the like that are consistently and repeatedly used to designate specific categories of objects, events or the like. Controlled vocabularies tend to remain fixed over time but change to accommodate improvement and other adjustment.

TERMINOLOGY DEVELOPED TO DESCRIBE DEVICE

Domain—a section or part of the device that focuses on one particular function. The set of domains comprises the device's Environment.

Outcome Domain—a section of the device that contains information about one or more outcomes for which the device Is intended to assist in achieving Choice Domain—a section of the device that permits the operator to maintain lists of choices pertaining to achieving a desired goal or outcome including links to associated information about said choices.

Knowledge Domain—a section of the device that permits the operator to enter or query information pertaining to the other Domains of the device (depicted as plane 4 in FIG. 1).

Ask Domain—a section of the device that permits receiving and sending information via telecommunications (depicted as plane 2 in FIG. 1).

View Domain—a section of the device that contains a controlled vocabulary comprising a hierarchy of non-mutually exclusive items (see below), and organizing links to the Knowledge Domain, the Ask Domain, and the Decision Support Domain (depicted as plane 6 in FIG. 1).

View Item—a single element of the controlled vocabulary of the View Domain.

The View—a reference to the hierarchy of View items of the View Domain.

Context / Non-Context—each View item sets the context for links to Decision Support, Knowledge, and Ask. If these other domains are accessed out of the context of a View item link, this is referred to as a non-context situation.

Decision Support Domain—a section of the device (depicted as plane 8 in FIG. 1) that contains information and data about a model by which the terms in the View Domain are related to one or more outcomes (as described in the Outcome Domain).

Choice-View Domain—a section of the device that links choices to view terms and which generates decision support information once a model is constructed in the Decision Support Domain and the links between view terms and choices are established.

Hierarchies of Non-mutually Exclusive Items—the use of the notion of hierarchy to organize factors (View items) which relate to one another as part of a Model, where a superior Node represents an output of the Model.

Associative Items—a set of factors (view items) which can be combined by techniques of multivariate analysis to express an output (typically some goal or outcome). These items can be used as terms in a Model to represent how the terms (as factors) relate to the outcome (as an output of the Model).

Multiplicative Items—the combining two or more items as terms in a model by the operation of multiplication.

Anchor—designation of a factor (or choice) as an anchor point for comparison to factors (or choices).

Weight—assignment of a relative value of strength to a factor (View item) in relation to another (usually the anchor View item).

Scaling Choices—assignment of a relative value of strength to a Choice in relation to another (usually the anchor choice) for a particular View item (usually the most subordinate items in a View).

Associates / Multiplies—designation of the relation of a particular View item in the model according to the definitions of Association and Multiplication (above).

Not Highest / Highest—designation of a particular View item as either 1) not the anchor (not highest), or 2) the anchor (highest) according to the definition of anchor above. (The item with the highest strength in affecting the outcome is chosen to be the anchor in the preferred embodiment).

Positive / Negative—designation of the relation of a particular View item as to whether its particular contribution to the outcome works in favor of its achievement (positive) or against its achievement (negative).

Files—a menu selection in the device related to file operations and printing

Edit—a menu selection related to editing a View

Tools—a menu selection in the device related to operator defined settings

Page—a menu selection in the device that permits the operator to navigate in the View Domain, and to navigate (in the context of a View item) to the Decision Domain, the Knowledge Domain, and/or the Ask Domain.

Domain—a menu selection in the device that permits non-context access of domains Search—a menu selection in the device that aids in placing the operator at a desired position (in terms of information or view) by a search and find operation

BRIEF DESCRIPTION OF THE DRAWINGS

FIG. 1 illustrates the scope of the invention in relation to the functions and forms of existing devices;

FIG. 2 illustrates a typical display device to facilitate operator interaction;

FIG. 3 illustrates the special function keys on a typical operator control device;

DETAILED DESCRIPTION

One suitable implementation of the invention is a personal computer system as illustrated in FIG. 2 and 3. Typically such a system is comprised of a CRT display device 10, a keyboard as partly shown in FIG. 3, and a central processing, (CPU) which may be located with the CRT or within a separate housing. The CPU typically has volatile and non-volatile memory in the forms of random access memory chips (RAM) and magnetic memory (disk). Disk memory is typically either floppy disk or hard disk, the latter of which is often a Winchester design. The unit further has an input/output port suitable for telecommunications which is typically a modem. Other accessories can include a mouse for augmenting or replacing the keyboard, voice response, optical and other large capacity memories, voice output, sequential video, camera, scanner and other input/output devices.

Information is displayed on the CRT as a result of interaction with the CPU. Actions of the CPU are dependent upon the contents of RAM and disk memory, the pattern in which the CPU accesses and processes such contents, and upon inputs received from the keyboard and other input devices. Information outputs include displays to the screen and outputs to memory, information channels, and hardcopy display devices.

In addition to providing information to the operator, the CRT display serves as a primary means to inform the operator of particular operations that are currently active. To assist in that display, the CRT screen 10 has designated areas that have special meaning to the operator. Area 12 is a menu bar which continually displays an initial set of command sequences that the operator may choose among to change the operation of the device. Area 16 is a status area that informs the operator what immediate operation sequence is currently available. Area 14 is used to display the various Domains (as referenced in the definition of terminology above). Further, additional display areas are created as required and appear as windows superimposed on the areas 12 and 14.

Figure 4:
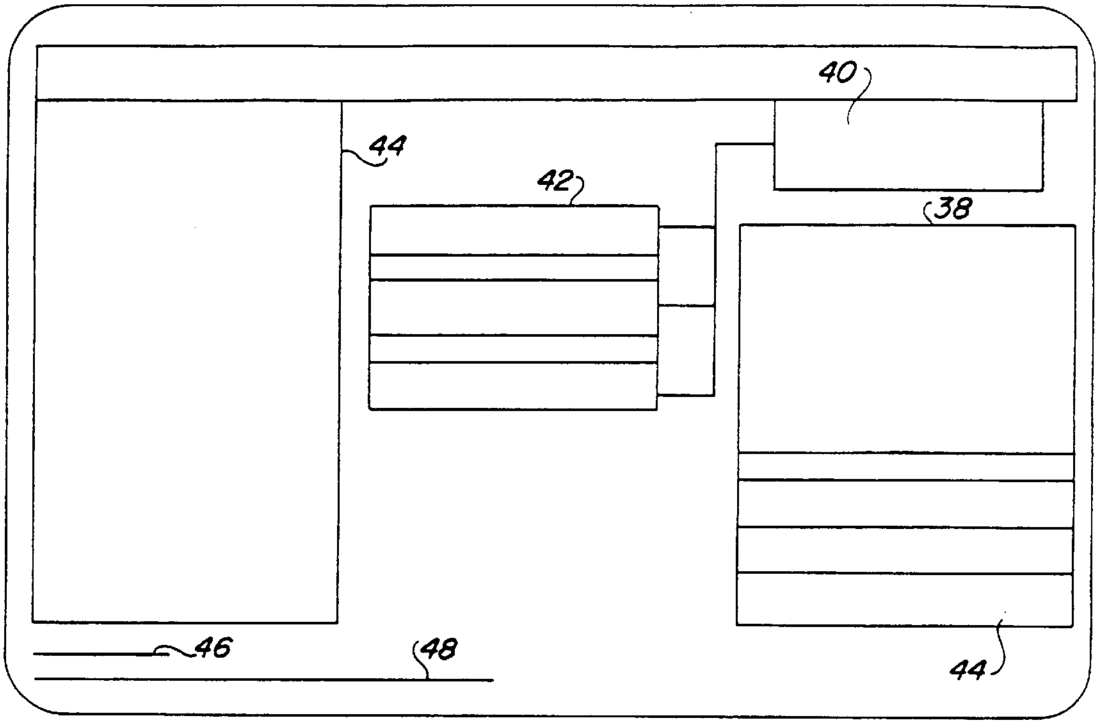
FIG. 4 shows the View Domain at a typical beginning position with example entries.

To provide coherence to the operator, the active display is divided into a set of domains which together comprise the environment available to the operator via the device. The domains of the device are described in the terminology section above. FIG. 4 shows the View Domain positioned where the Outcome appears in the superior node position 40 and also as the superior most item in a list in position 38. View items at the current level are displayed in center screen 42. Subordinate nodes for the View items appearing in 42 appear in area 44 in outline form under the appropriate View item to show relationship. Using display areas 38 and 44 in tandem with 42 provides the operator with a continuous sense of how the current level in the hierarchy is related to the hierarchy as a whole. At any time, only one of the boxes in 42 is active for entry or editing as a text field and is highlighted by reverse video as an indication to the operator. Also, because the entry area is limited in viewing area and extends beyond the twenty characters viewable at any time, area 46 displays up to 80 characters of the same text material. Instruction to the operator of the next immediate operation sequence appears in area 48. The Decision Support Domain information and data associated with the current View item appears in area 44.

Using navigation described later in reference to FIG. 6, the display can be changed to show a different level in the hierarchy. Appearing in the superior node area 50 is no longer the outcome but the broader term for those items appearing at area 56. Area 52 displays the outcome in the final position in the list and all subordinate nodes that lead to it in a reverse outline style. The current level nodes appear in area 56 and the subordinate View items to these nodes appear in area 58 in outline fashion. The current editable field is expanded at area 60 and the current operation sequence is stated in area 62. The Decision Support Domain information and data associated with the current View item appears in area 54.

Figure 6:
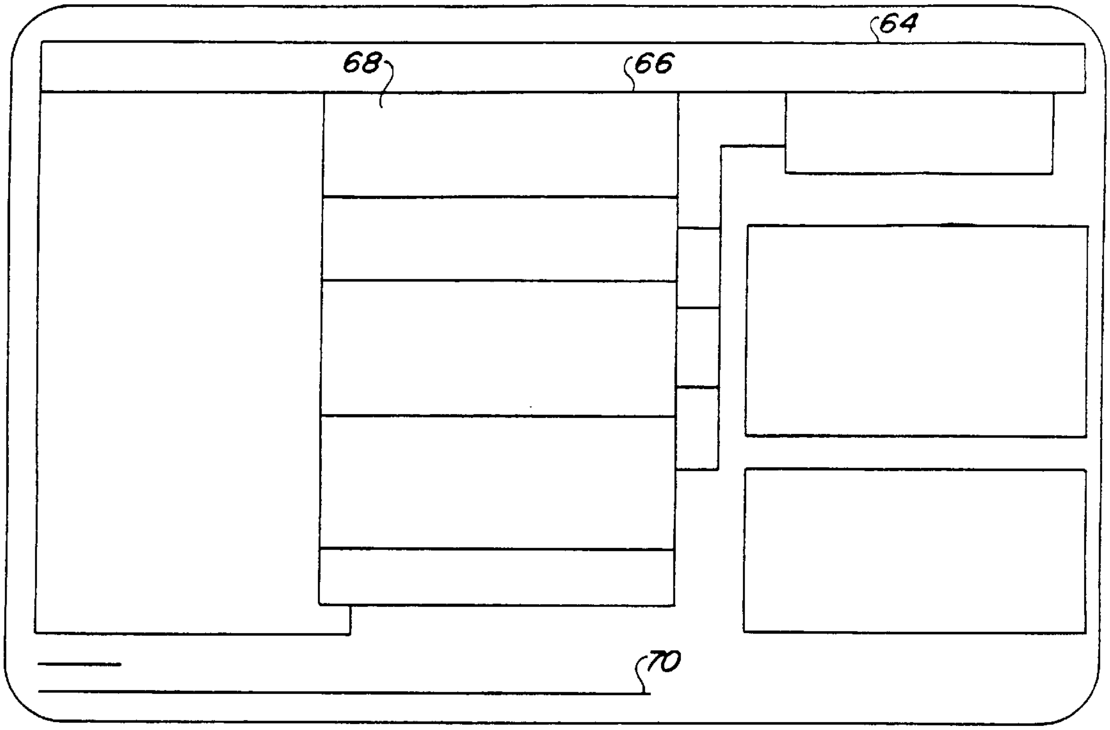
FIG. 6 shows the page sub-menu listing navigation commands for moving within the View Domain and to other Domains (in context)

FIG. 6 shows navigation commands available to the operator as sub-menu items to the Page menu selection in area 64. The operator may choose a navigation command by using the up and down arrow keys to change the menu selection that is designated by reverse video in the sub-menu box. The single keystroke equivalents to these commands is listed 66 in the submenu box, to the right of the navigation command title 68. Status Line 70 summarizes the action taken by each sub-menu command (Single keystrokes make accessing the menu via key F10 22 unnecessary and speed operator use of the device.)

Figure 5:
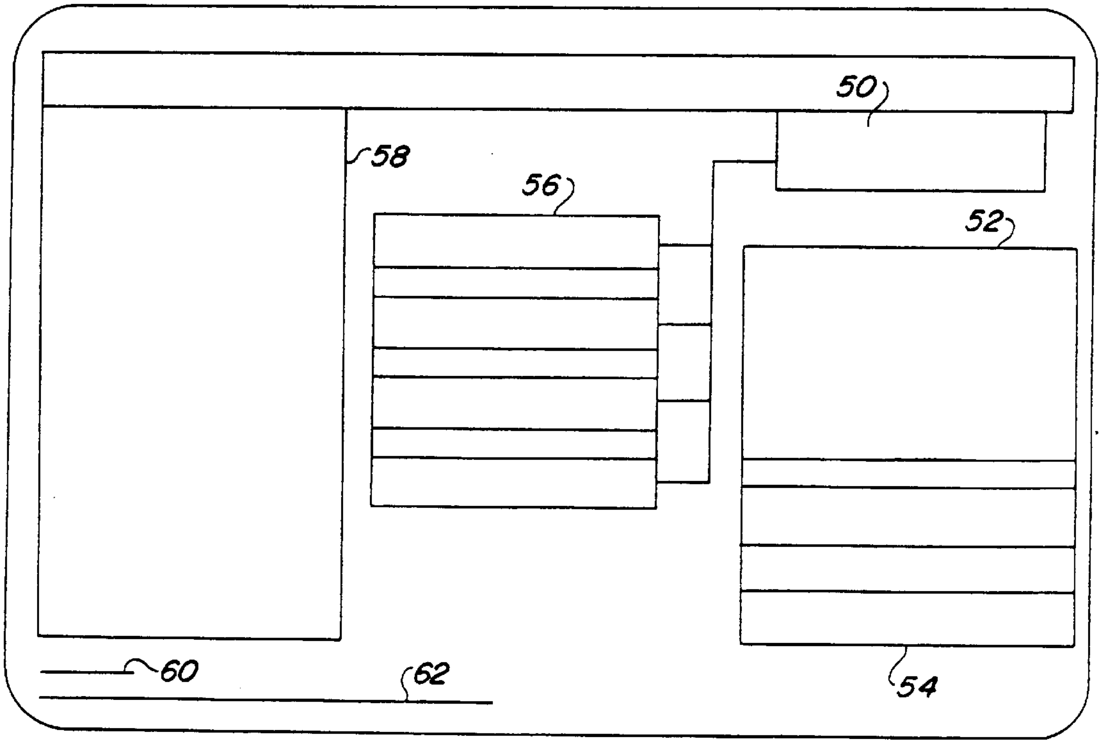
FIG. 5 shows the View Domain at a typical mid-level view with example entries.
Figure 7:
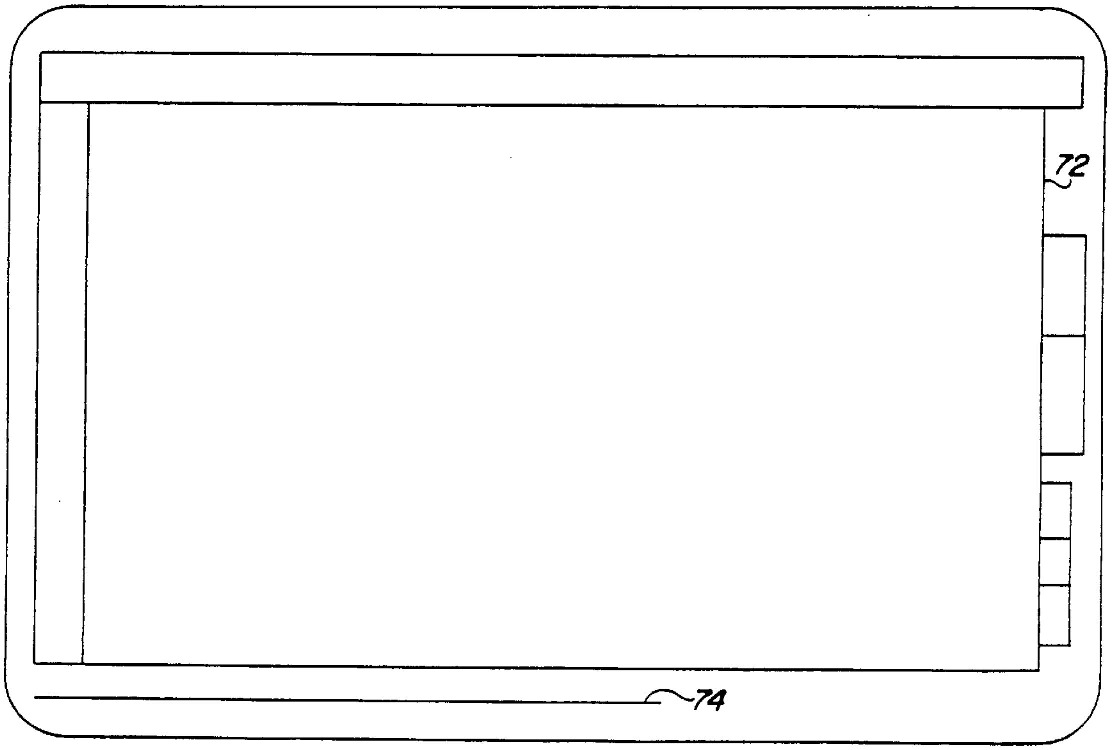
FIG. 7 shows the Knowledge Domain with example entries.

FIG. 7 shows a context access to the Knowledge Domain 72 using Ctrl PgUp 26 and 30 from the View position shown in FIG. 5. Status line 74 summarize the meaning of counts to the right of some categories of knowledge shown in 72 and further navigation is achieved by highlighting a knowledge topic and pressing Return on the keyboard (FIG. 3).

Figure 8:
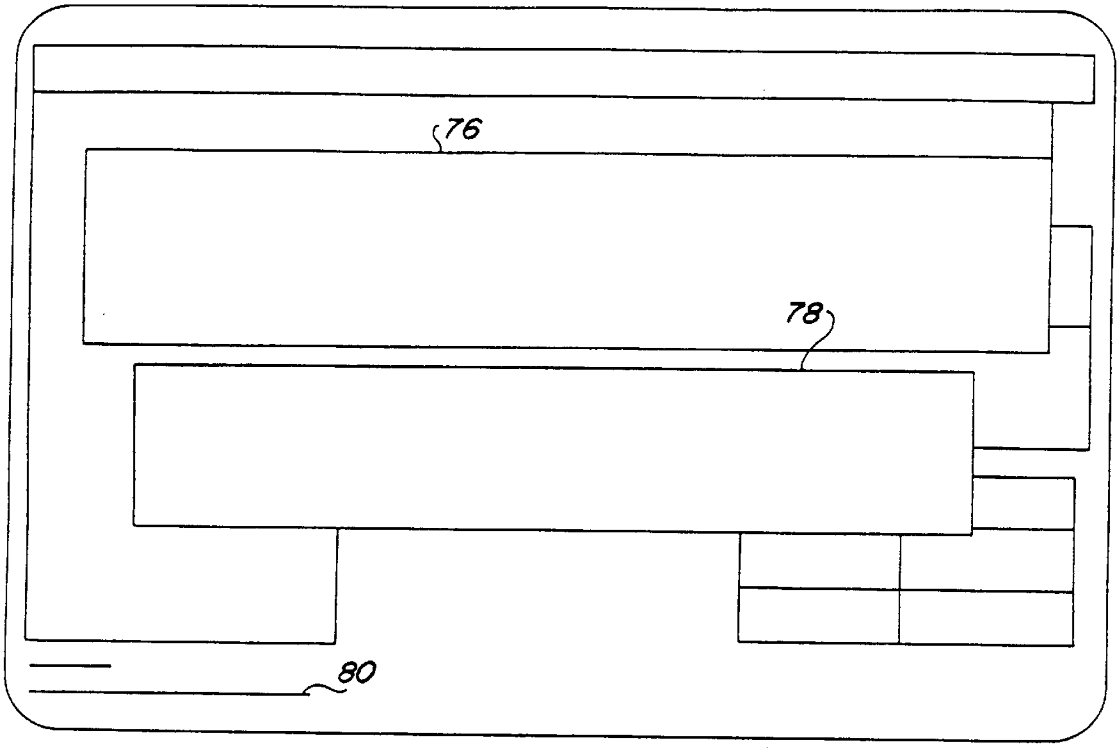
FIG. 8 shows the Ask Domain with example entries.
Figure 9:
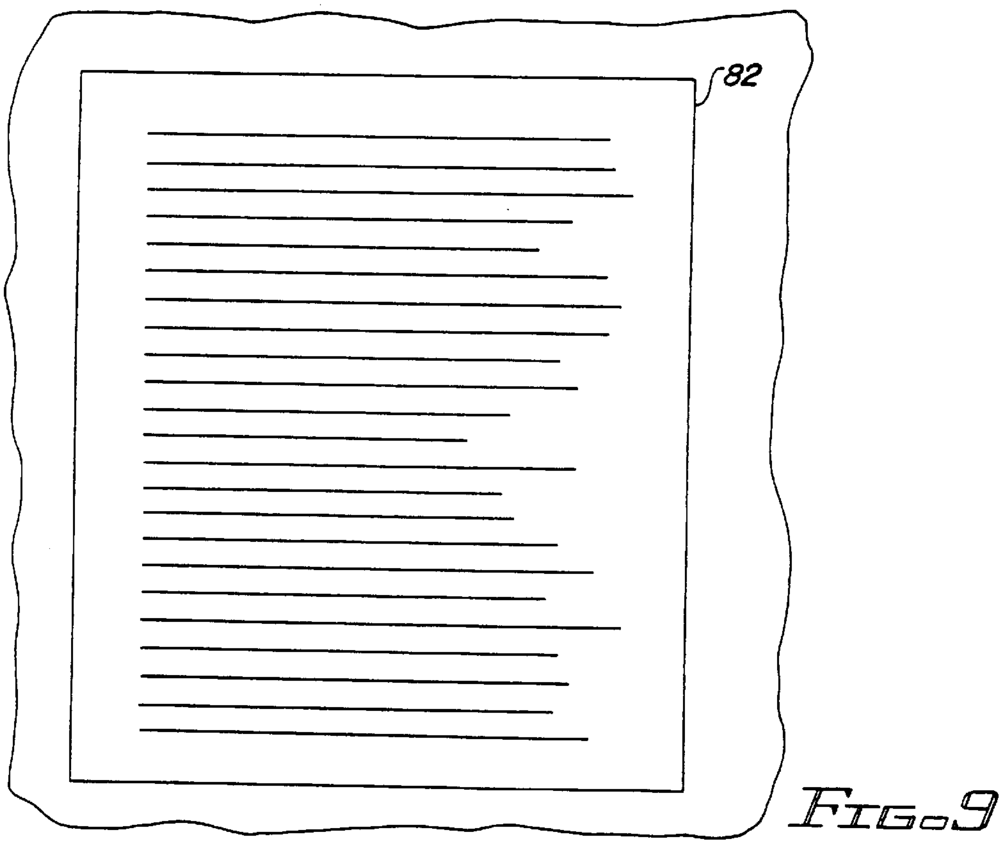
FIG. 9 shows a context help window when at the Ask Domain and in the word-processor editor.
Figure 10:
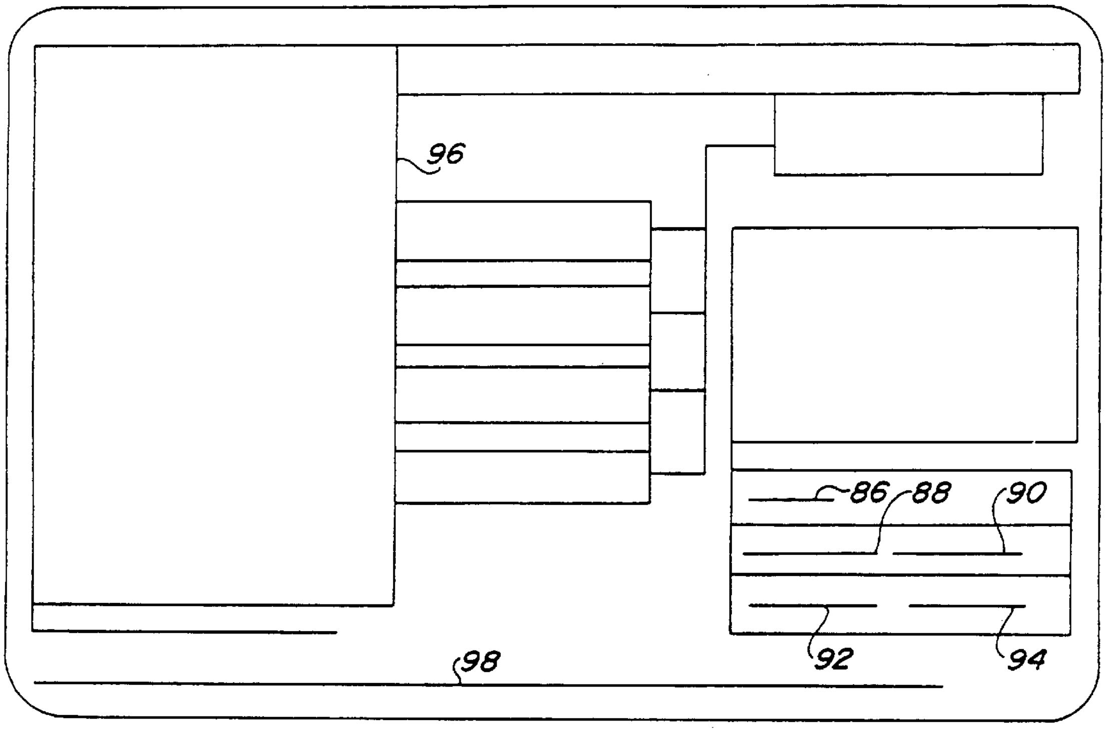
FIG. 10 shows the Decision Support Domain with the weight selections appearing and with example entries.

FIG. 8 shows a context access to the Ask Domain 76 using Ctrl PgUp 26 and 30 from the context knowledge position shown in FIG. 7. The status line 80 informs the operator they are in the word processing editor 78. A text message is entered in area 78 but little background information is needed since the context and view are typically sent with the message. Also, the addressee for the message can be linked to the context and require no further operator input at this time. Operations available to the operator while in the editor are shown in window 82 in FIG. 9. The operator returns to the Knowledge Domain and / or the View Domain by using Ctrl PgDn 26 and 32.

Migrating from the View item in FIG. 5 to the Decision Support Domain 54, the operator uses Ctrl PgDn 26 and 32. The five data / information entry fields are reached using the up and down arrow keys in FIG. 3. In the first location 86 a short alias for the View item is entered or edited (the device automatically constructs the alias from the View item entry 56. The next three entries are model terminology choices discussed above. Dyad choices appear in a pop-up window and the operator makes a selection using Home 34 and End 36 keys and pressing return. The final entry area 94 can be changed either by 1) making a selection from area 96 or 2) by entering a number on the keyboard. The operator can return to the View Domain using Ctrl PgUp 26 and 30.

Figure 11:
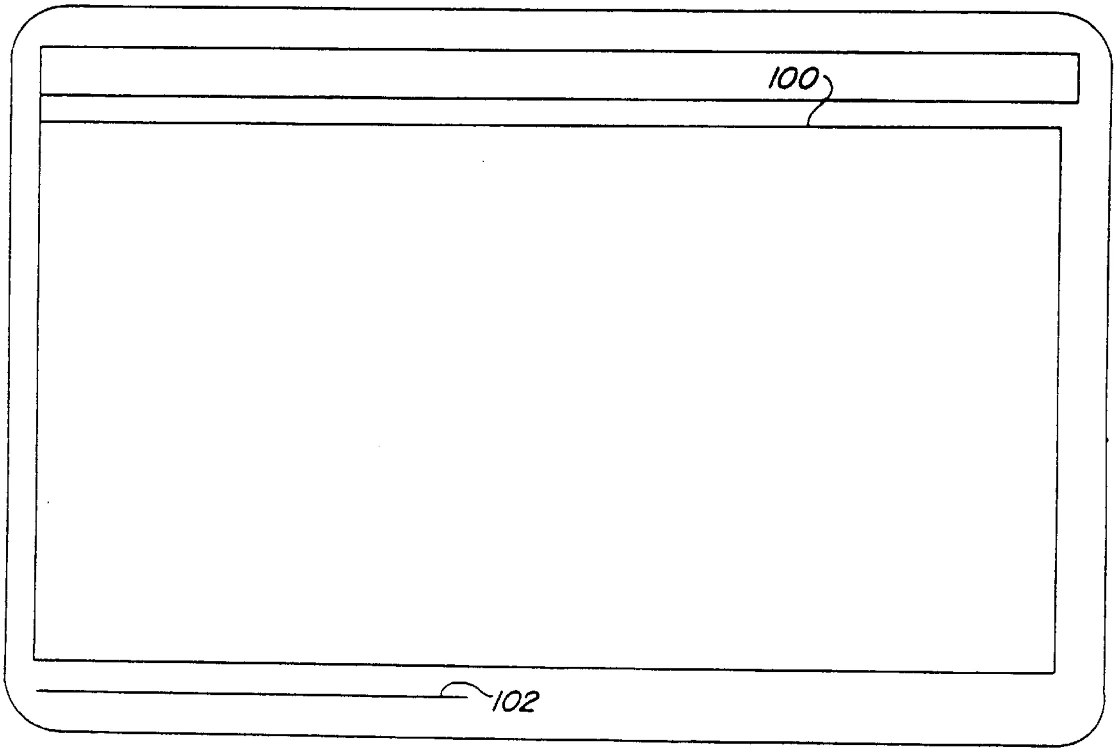
FIG. 11 shows the Choice Domain with example entries.

FIG. 11 shows a list of choices in the Choice Domain 100. This domain is reached by accessing the menu, choosing Domain, and choosing the sub-menu item Choices (see FIG. 26). The status line 102 informs the operator how to leave the current domain.

Figure 12:
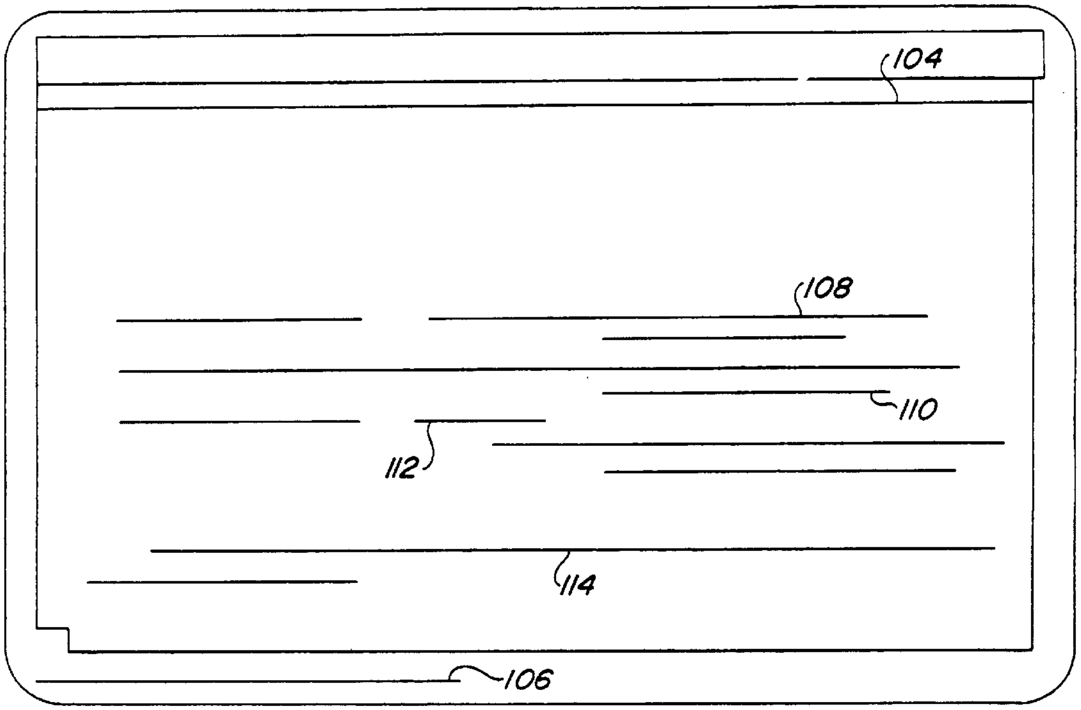
FIG. 12 shows the Choice-View Domain with example outputs from the device.

FIG. 12 shows a stage in the Choice-View domain, after choices have been scaled (see scaling above) where decision support information is provided by the device in window 104. In this stage, choices are grouped in three categories: most suited 108, least suited 110, and marginally suited 112. Further summaries (which describe the relationship between the ranking of a choice and specific View items) are available to the operator 114. The status line 106 informs the operator how to leave the current domain. (Weights have been set and choices have been scaled using magnitude estimation scaling. Correspondingly, the associative View items are combined together in a model employing weighted geometric averaging to produce a rank ordered list of choices. Multiplicative items are combined by multiplication prior to computing the geometric average.)

Figure 13:
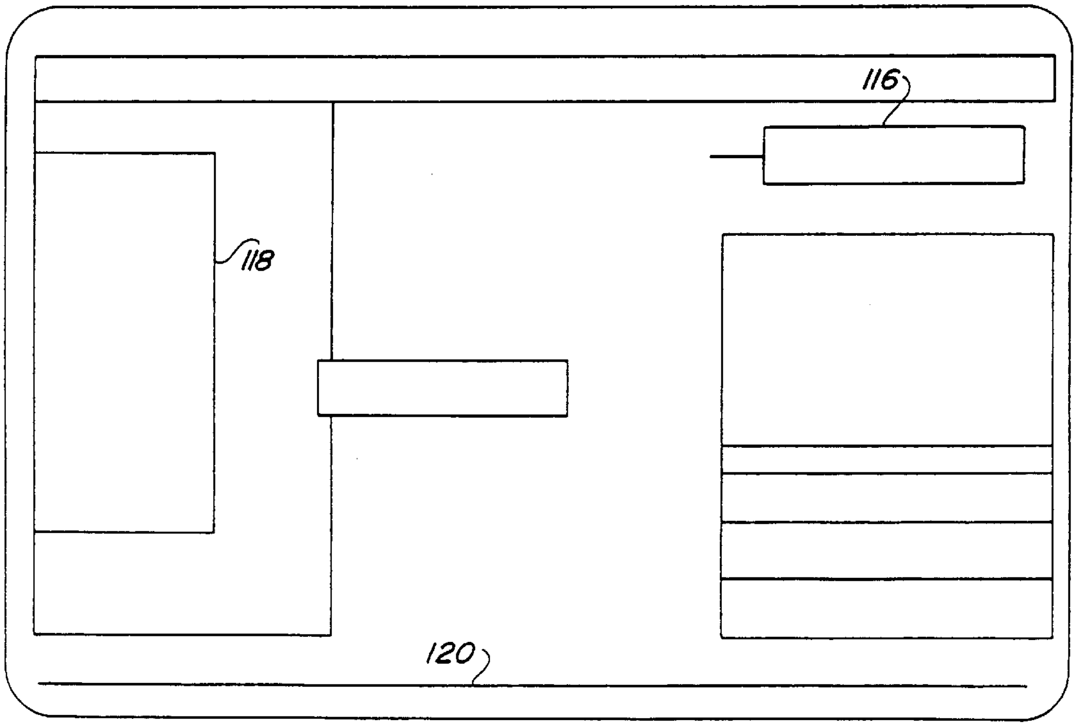
FIG. 13 shows the View Domain ready for operator entry of a new View with a help selection menu active in the screen.

FIG. 13 shows the View Domain when a new View is being created. The View is unnamed at position 116 and the display areas show empty boxes and space. In this illustration, the operator has also pressed F9 20 to access a help selection menu 118. The status line 120 informs the operator how to choose among the help selections.

Figure 14:
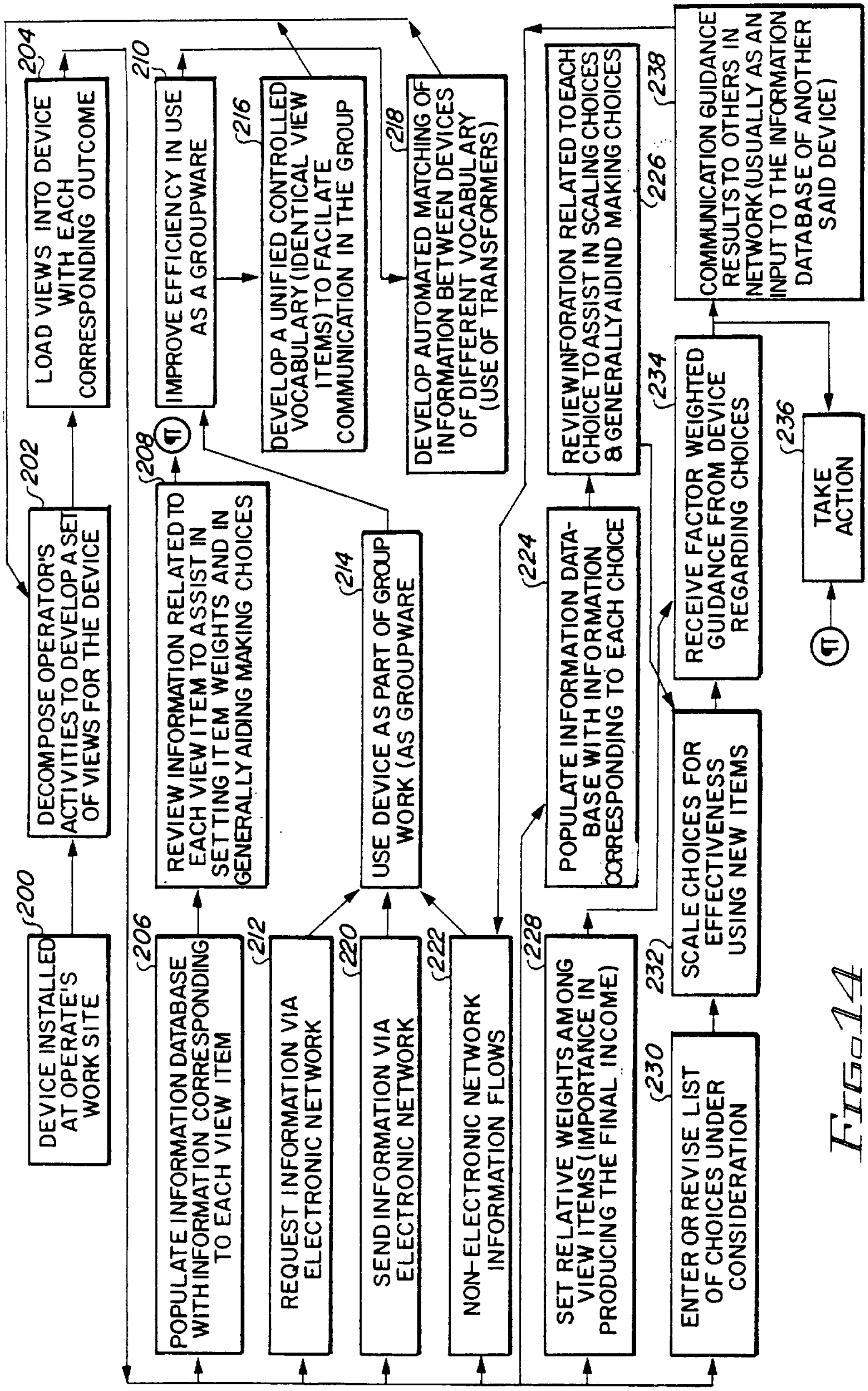
FIG. 14 is a flow chart pertaining to operating the device in a user setting.

FIG. 14 is a flow chart of how the device and its environment fit into a work environment. The device is installed at the operator's work site 200. Views are constructed that define the operator's activities and goals 202 and the Views are loaded into the device corresponding to each outcome 204. At this stage, the operator has several different activities to perform that correspond to the domains described above. Corresponding to the Knowledge domain, the operator can populate the information database with information corresponding to each view item 206 or populate the information database with information corresponding to each choice 224. Corresponding to the Ask Domain, the operator can request information via the electronic network 206 or request information via the electronic network 220. There are also associated non electronic network information flows 222. Corresponding to the Decision Support Domain, the operator can set relative weights among view items 228, and corresponding to the Choices Domain, can enter or revise the list of choices under consideration 230. Corresponding to the Choice-View Domain, the operator can scale choices for effectiveness using view items 232 and receive factor weighted guidance from the device regarding choices 232. At this point the operator can take action 236, one action of which is to communicate guidance results to others in the network (usually as an input to the information database of another said device) 238.

The flow of information to and from others in the group forms the basis of the device as a part of group work (groupware) 214. Greater efficiency in groupware is achieved when 1) a unified controlled vocabulary of identical view items is used across the group and / or 2) when automated matching of information between said device and another said device of different vocabulary is achieved through a transformer 218.

There is feedback in the system where the improvements in Views is brought back to installing views 202. Also information flows in 212, 220, and 222 serve to further populate the view and choice information databases which lead to changes in operator set weights and scalings.

METHOD OF OPERATION

When the process is initiated, the screen appears as in FIG. 13 with an empty, unnamed View and an open Help window. Upon exiting the help window, the main control loop is depicted in the flow chart of FIG. 15. Testing for Alt C (closing of the View) 240 the process branches. If the View is not closed the process continues to making the superior node box 40 the active region permitting the operator to enter an outcome 242. At this point there are three View editing functions the operator can use (insert—Alt I, insert left—Alt L, and delete—Alt D). At test point 244 if the operator attempts to insert when the superior node box contains the outcome name, the unit refuses the request 246 since only one outcome is permitted for each view. Using insert left is the only operation available unless the operator wishes to further edit the outcome 245. Using Alt L at test point 248 the active region is positioned to a subordinate node to the current level 250 and a new node is inserted in the hierarchy 252. At test point 254 if Alt L is again used, the process loops back to 248 and to 252 to insert another subordinate node. Otherwise, at test point 258 if the operator presses Alt I, the process loops back only to 252 which inserts another subordinate node but at the current level (not a subordinate level). The rest of the test points 260 through 270 test for navigation between the current level and superior 264, 282 or subordinate nodes 266. 280; between the current level and the first node of the first subordinate position 268, 278; to the knowledge domain 260; to the Decision Support Domain 262; or to delete the current highlighted node 270. When a deletion occurs the current node is removed 272 and subordinate nodes are also removed if present 274. The active region becomes the node prior to the deleted node, or if none, then the adjacent superior node 276. If none of these operations are chosen then actions are described in FIG. 16 showing navigation at the current level in the hierarchy and returning to the main control loop at Edit Current Node 256.

Figure 15:
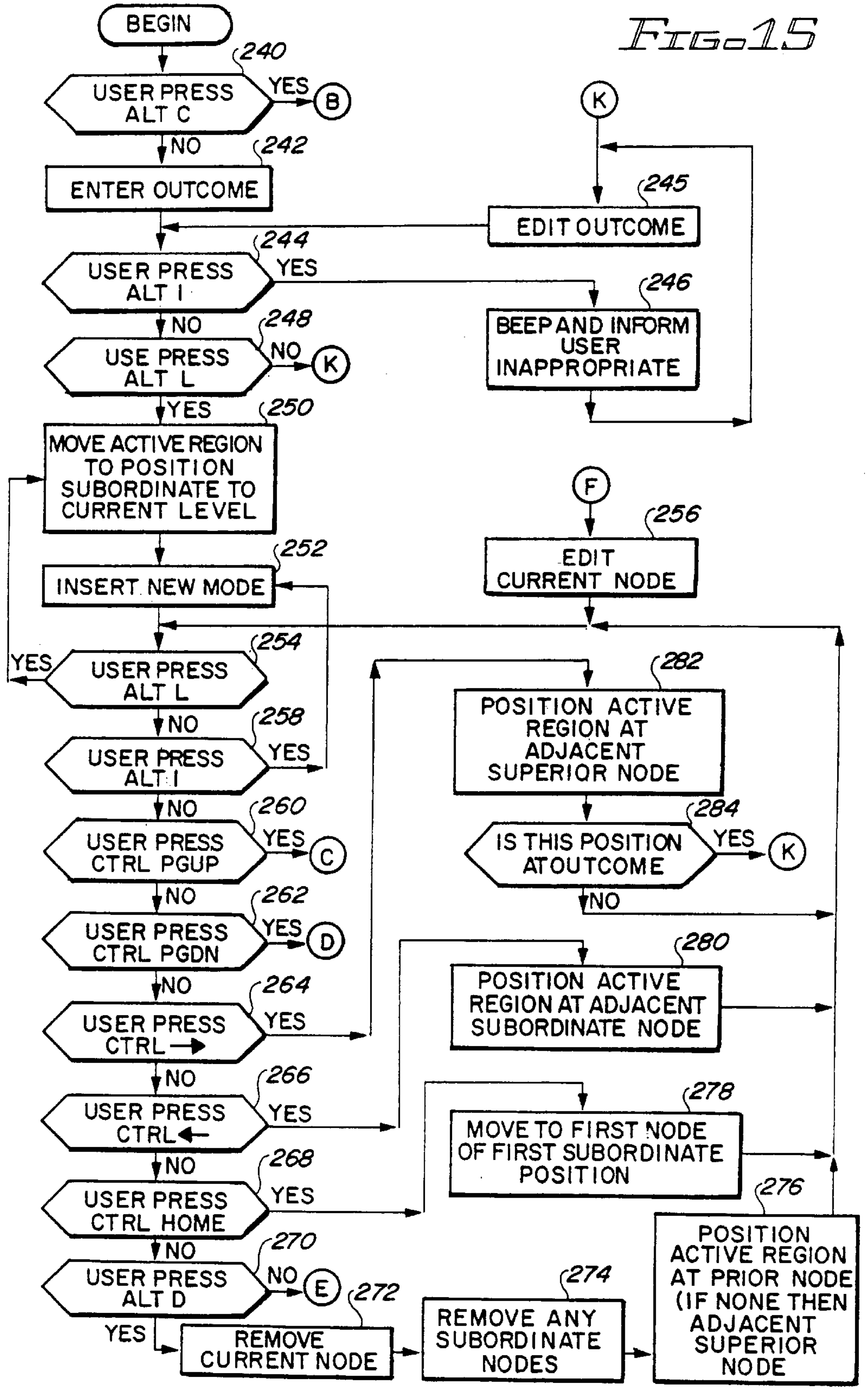
FIG. 15 is a flow chart of a main control loop when positioned at the View Domain.
Figure 16:
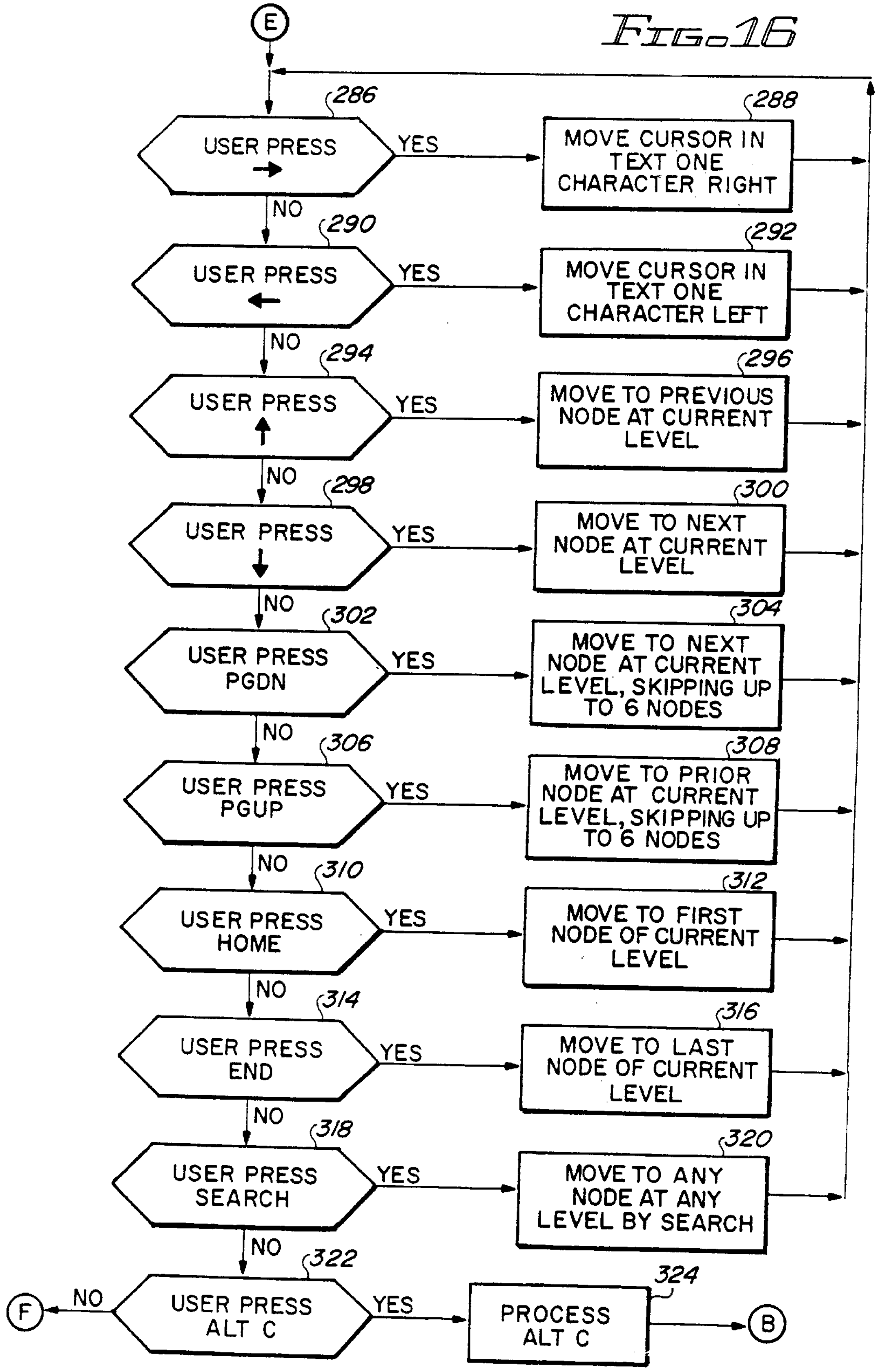
FIG. 16 is a flow chart of navigation actions when positioned at the View Domain.

FIG. 16 contains 10 test points from 286 through 322. If the operator presses right arrow, the cursor moves one character to the right at the current active text region 286, 288. If the operator presses left arrow, the cursor moves one character to the left at the current active text region 290, 292. If the operator presses up arrow, the active region moves one node above the current node 294, 296. If the operator presses down arrow, the active region moves one node below the current node 298, 300. If the operator presses PgDn, the active region moves to a lower node skipping up to 6 nodes (if there are sufficient intervening nodes) 302, 304. If the operator presses PgUp, the active region moves to a higher node skipping up to 6 nodes (if there are sufficient intervening nodes) 306, 308. If the operator presses Home, the active region moves to the first node of the current level 310, 312. If the operator presses End, the active region moves to the first node of the current level 310, 312. If the operator chooses Search from the Page Sub-menu, the operator can move to any node at any level by a text search process 318, 320. Pressing Alt C will close the current View 322. 324 and if none of these 10 test points match keyboard input, the process is returned to the main loop 256 in FIG. 15.

Figure 17:
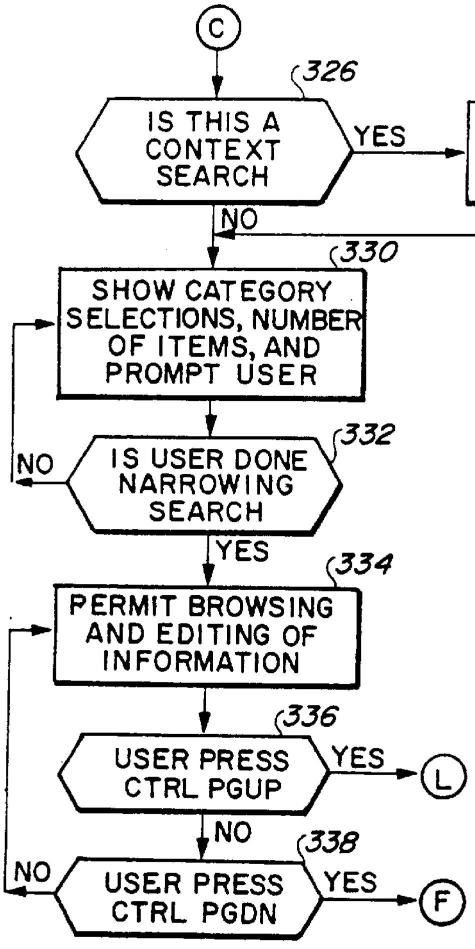
FIG. 17 is a flow chart of actions in the Knowledge Domain.

If the operator uses Ctrl PgUp at test point 260 (or chooses the Knowledge Domain in the Domain Sub-menu, see FIG. 25) the Knowledge Domain portion of the process becomes active as shown in FIG. 17. At test point 326 a screen is automatically set on the information database 328 if this is a context use of the Knowledge Domain she information is screened for linkages to the current View item and all View items subordinate to the current View item). The operator thus performs a broader or narrower search of the information database depending on the operator's current position in the View hierarchy. The operator is then presented with a display screen showing further categorization of the information with accompanying counts of the numbers of entries in each further category 330. The operator can further screen the information by accessing additional subcategory screens 332 (each screen effectively performing a Boolean AND condition pertaining to the information database). Browsing and editing of the information items in the resulting set is then permitted 334. In the context mode, the operator returns to the View Domain using Ctrl PgDn 338 or enters the Ask Domain using Ctrl PgUp 336.

Figures 18, 19, 20:
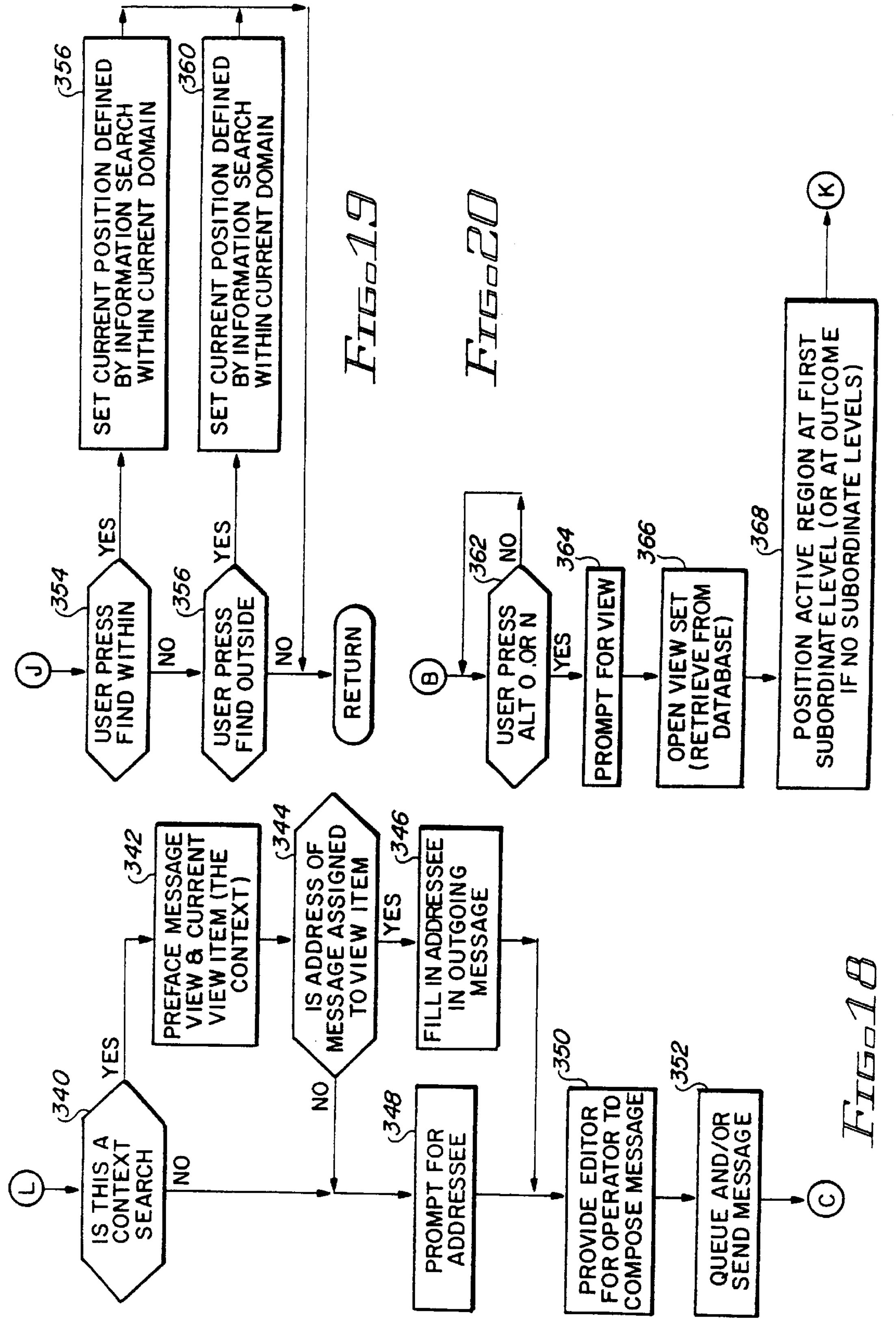
FIG. 18 is a flow chart of actions in the Ask Domain.
FIG. 19 is a flow chart of actions when positioned at Search.
FIG. 20 is a flow chart of actions when the View Set is closed.

Operations in the Ask Domain are shown in FIG. 18 and, as with the Knowledge Domain, the sequence depends on whether there is context 340. If there is context, a preface to the outgoing telecommunicated information is constructed from information about the current View item and the View altogether 342. If addressee information is also assigned that corresponds to the View item 344, the addressee is automatically assigned to the message 346. Otherwise, the operator is prompted for the addressee 348. At this step the user is provided word processing facilities to compose a message 350 and at 352 the message is either queued or telecommunicated.

Movement within and between domains by search is shown in FIG. 19. If the operator selects Find Within in the Search sub-menu 354 the current position is defined by an information search within the current domain 356. Otherwise, if the operator selects Find Outside, the current position is defined by an information search in another selected domain 360.

FIG. 20 shows sequences available when a View is closed. Except for operations always available shown in FIG. 21, the only keystrokes available are Alt O (to open a View) and Alt N (to begin a new View) 362. At 364 the operator can choose among existing Views and at 366 the selected View is made active. The active region on the display screen is set to the first node of the first subordinate level 368 (unless there is no subordinate node in which case the Outcome becomes the active region).

Figure 21:
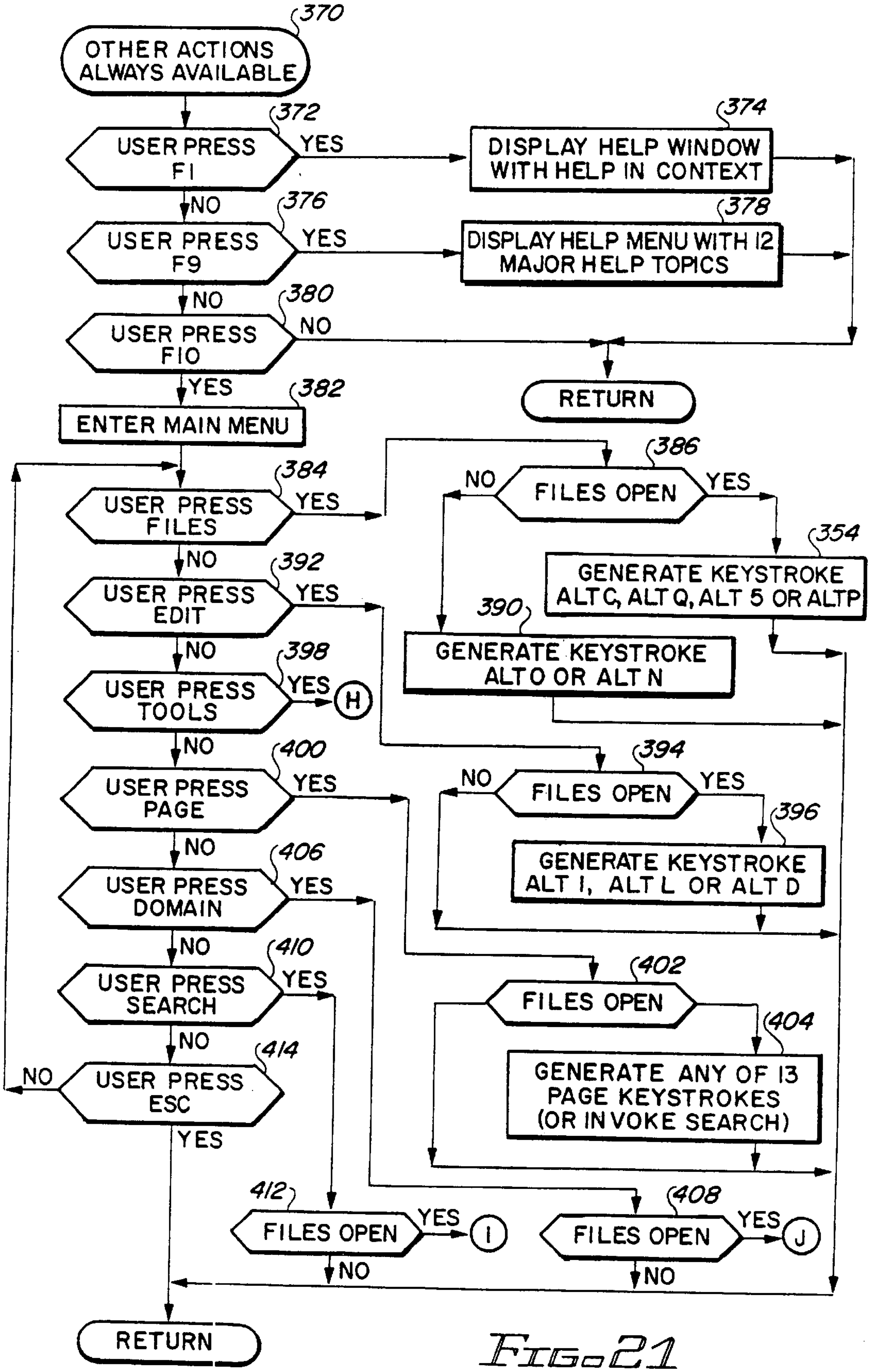
FIG. 21 is a flow chart of other actions available at all times in ail domains.
Figure 25:
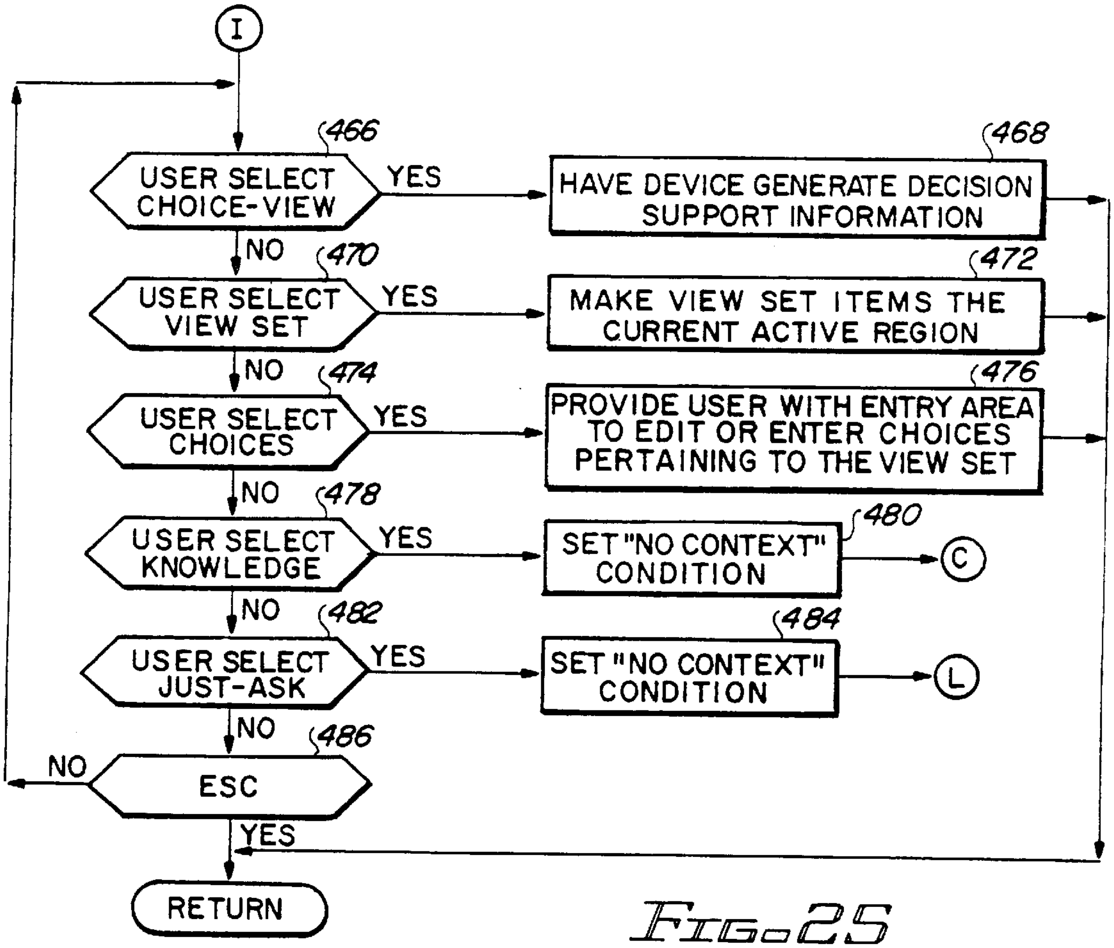
FIG. 25 is a flow chart of actions when the Domain Menu is selected.

FIG. 21 shows sequences that are available regardless whether a View is oven or closed. At test point 372 pressing F1 18 invokes a help window 374 with help in context (Note: this is in context to the current active region of the device, not in context to the View item referred to elsewhere in the discussion). At test point 376 pressing F9 20 invokes a help menu with 12 major topics of help about the device 378. Finally, pressing F10 at test point 380 invokes the main menu 12. There are six menu selections shown as test points and sub-menus are available for each of the main menu topics. Choosing Files 384, the available sub-menu items depend on whether files are open or closed 386 and choices available when files are open are shown 354 and choices for when files are closed are shown 390. Choosing Edit 392, the sub-menu items are available only if the files are open 394 and are shown 396. Choosing Tools 398, the sub-menu items are always available and are shown in FIG. 15. Choosing Page 400, the sub-menu items are available only if the files are open 402 and are shown 404, 66. Choosing Domain 406 or Search 410, the sub-menu items are available only if the files are open (408 and 412) and are shown in FIG. 25 and FIG. 19, respectively. Pressing Esc 24 will exit the main menu 414.

Figure 22:
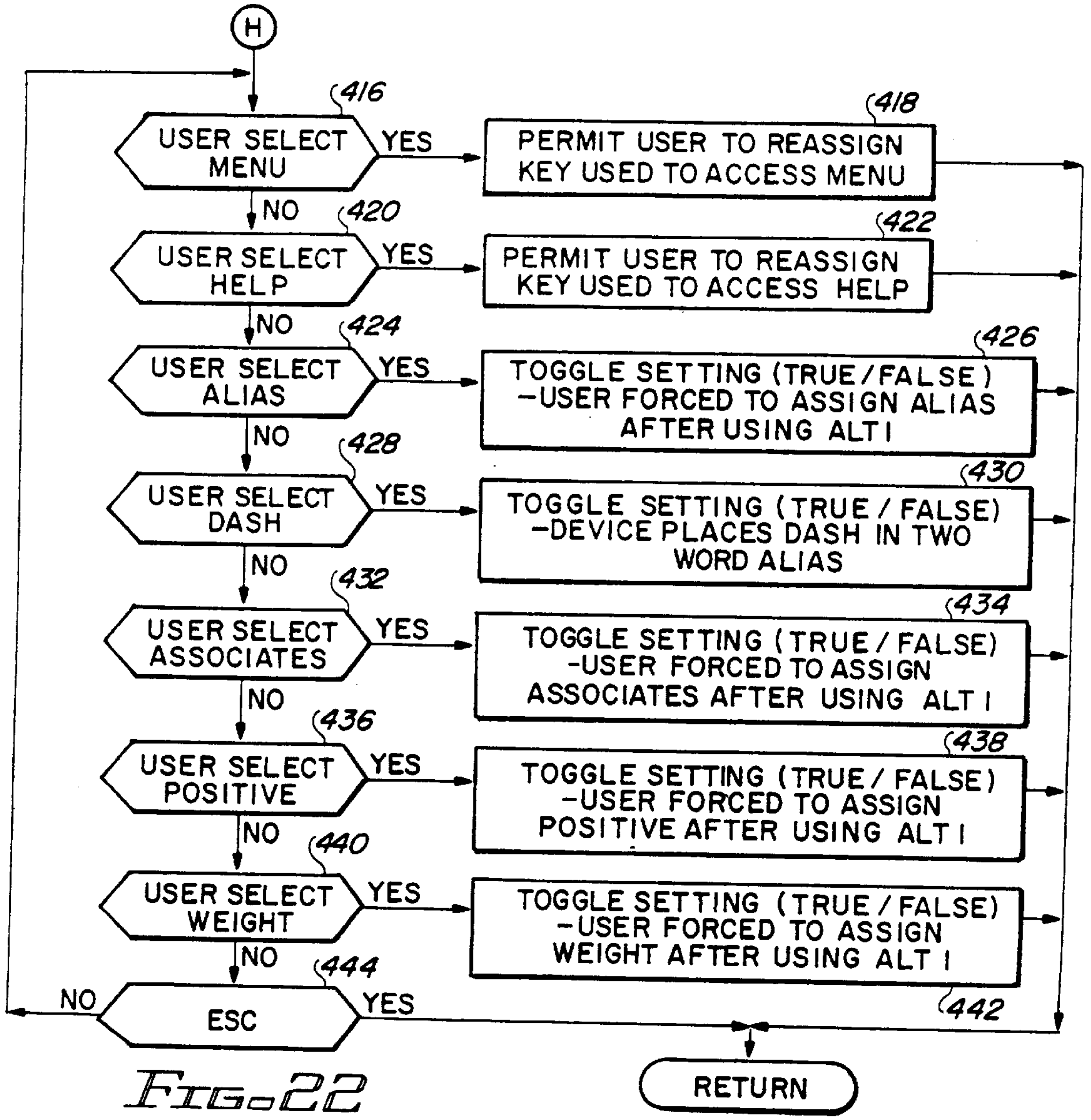
FIG. 22 is a flow chart of actions when the Tools Menu is selected.
Figure 23:
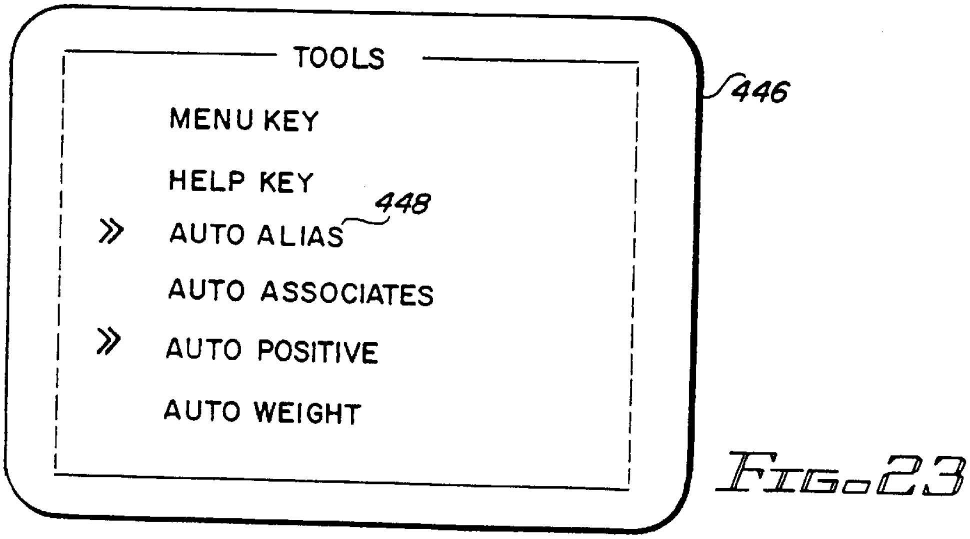
FIG. 23 shows a screen view of the Tools Menu selections.

FIG. 22 shows operations contained under the Tools Sub-menu selection. Choosing Menu 416, the operator can reassign the key used to access the menu 418. Choosing Help 420, the operator can reassign the key used to access context help 422. Choosing Alias 424, the operator can toggle a setting (true / false) as to whether the operator is forced to assign an alias to a View item after using Alt I (insert a View item node) 426. Choosing Dash 424, the operator can toggle a setting (true / false) as to whether the device places a dash in the alias of a View item after using Alt I (insert a View item node) 430. Choosing Associates 432, the operator can toggle a setting (true / false) as to whether the operator is forced to assign associates / multiplies to a View item after using Alt I (insert a View item node) 434. Choosing Positive 436, the operator can toggle a setting (true / false) as to whether the operator is force to assign positive / negative to a View item after using Alt I (insert a View item node) 438. Choosing Weight 440, the operator can toggle a setting (true / false) as to whether the operator is forced to assign a weight to a View item after using Alt I (insert a View item node) 442. Pressing Esc 24 will exit the main menu 444. FIG. 23 shows a screen view of the tools menu selections 446 and shows an item checked in the TRUE condition 448.

Figure 24:
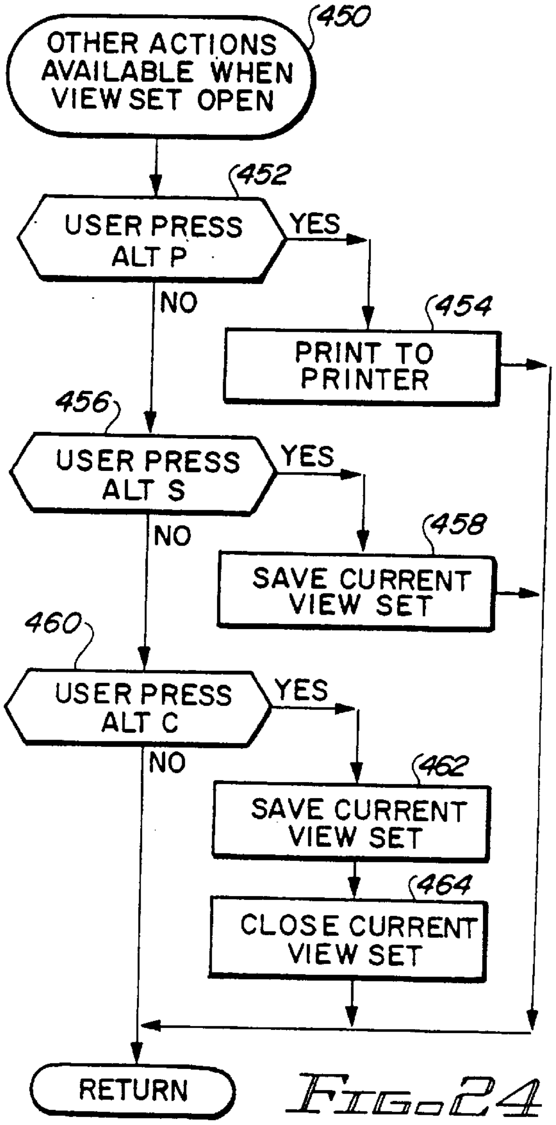
FIG. 24 is a flow chart of actions available when the View Set is open.

FIG. 24 shows three other actions available when a View is open 450. If the operator presses Alt P 452, a print representation of the current domain is sent to the printer 454. If the operator presses Alt S 456. The current contents of the View is saved to the database on disk 458. If the operator presses Alt C 460, the current contents of the View is saved to the database on disk 462 and the current View is closed 464.

Figure 26:
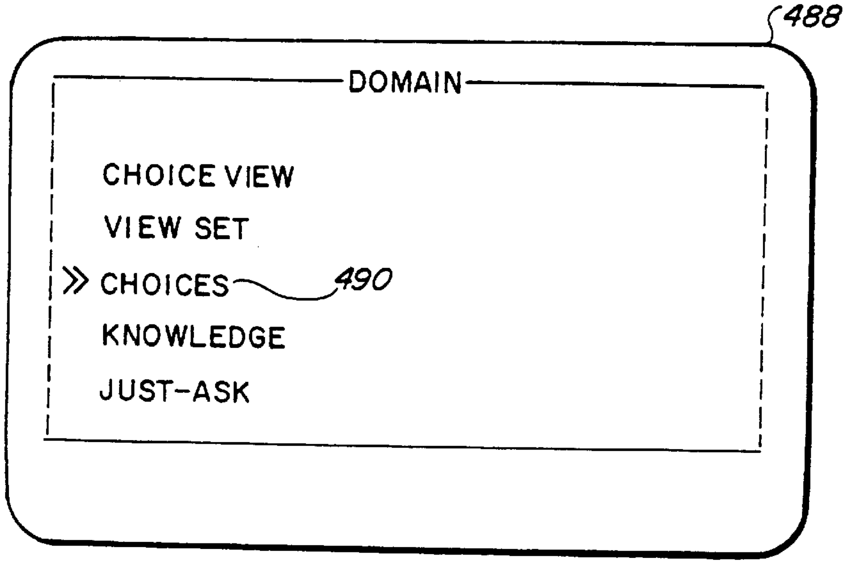
FIG. 26 shows a screen view of the Domain Menu selections.

FIG. 25 shows selections within the Domain sub-menu. FIG. 26 shows a screen view of the domain menu selections 488 and shows the current Domain that is active with a check 490. If the operator selects Choice-View 466, the device will generate decision support information 468. If the operator selects View Set 470, the View will become the active region on the device 472. If the operator selects Choices 474, the Choices Domain will become the active region on the device 476. If the operator selects Knowledge 478, the Knowledge Domain will become the active region on the screen (in non-context mode) 480. If the operator selects Just-Ask 482, the Ask Domain will become the active region on the screen (in non-context mode) 484. Pressing Esc 24 will exit the main menu 486.

Figure 27:
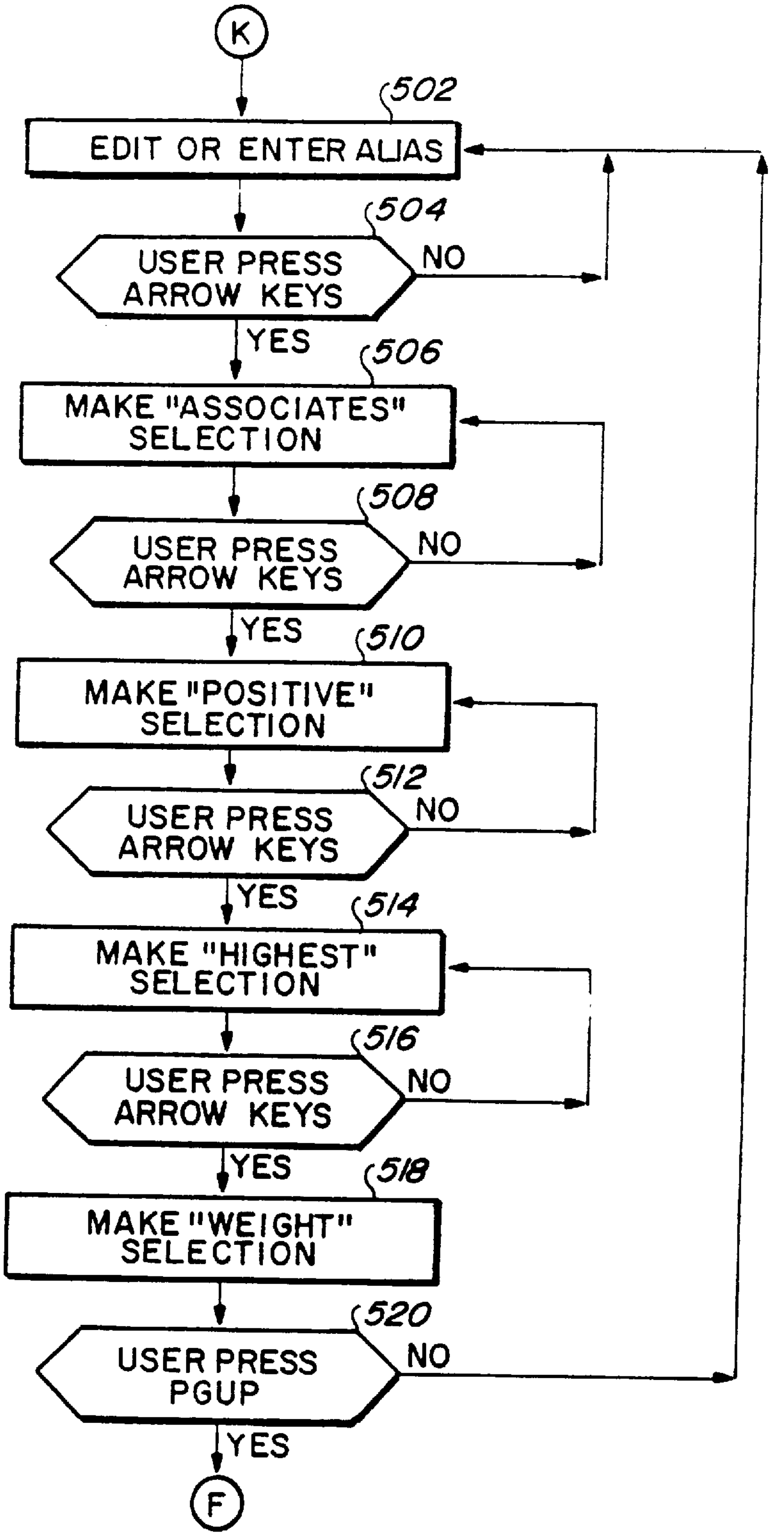
FIG. 27 is a flow chart of actions in the Decision Support Domain.

FIG. 27 shows operations in the Decision Support Domain. Using Ctrl PgDn when positioned at a View item in the View Domain, the active region becomes a text line area to edit or enter an alias (a short form) for the View item 502. Using the down arrow key 504, the active region is an area for the operator to choose between associates and multiplies 506. Using the down arrow key 508, the active region is an area for the operator to choose between positive and negative510. Using the down arrow key 512, the active region is an area for the operator to choose between not highest and highest 514. Using the down arrow key 516, the active region is an area for the operator to choose among possible weight settings or to enter a numeric weight value using the keyboard 518. Using Ctrl PgUp, the active region is returned to the View Domain 520.

Although specific embodiments of the preferred form of the present invention have been described herein, it will be evident to those skilled in the art that the invention finds utility in connection with the development of other hierarchical structures; and, further, that the device is a unique invention when considered without the decision support layer and is a unique invention when considered without the telecommunication layer. Other variations may be made in the construction, arrangement or operation of the parts or elements of the various embodiments disclosed herein without departing from the spirit and scope of the invention as defined in the following claims.

What is claimed is:

1. A computer system for use by human operators, the computer system comprising:

a plurality of processors, wherein each human operator has control of one of said processors in said plurality of processors, at least one of said processors being connected to at least one other one of said processors via a communications channel, an input/output device coupled with each of said processors for communication of signals and symbols between said processor and a corresponding human operator, and for communication of commands from a human operator and a corresponding processor, a memory element dedicated to each of said processors, a controlled vocabulary dictionary including a plurality of dictionary items of said controlled vocabulary dictionary stored in said memory element dedicated to each said processor, a plurality of database information items indexed by each of said dictionary items of said controlled vocabulary dictionary for each one of said processors, whereby a set of said database information items is uniquely indexed by each of said dictionary items, editing elements adapted to receive commands from an operator and responsive to such commands to alter said controlled vocabulary dictionary whereby dictionary items may be edited, added, or deleted, the editing elements including remote transfer elements adapted to transmit, via said communications channel, changes to the controlled vocabulary dictionary, telecommunication processing elements responsive to commands from an operator to select one of said database information items, indexed by a selected one of said dictionary items, for delivery via a telecommunications message with said selected dictionary item embedded therein to a destination selected by said operator whereby said operator may deliver said database information item to another processor, storage control elements adapted to store telecommunicated messages received by one of said processors as a database information item indexed by one of said dictionary items, by matching said embedded dictionary item in said message with a corresponding item in said controlled vocabulary dictionary stored in the memory of the receiving processor.

2. The system of claim 1 wherein said remote transfer elements are responsive to commands from an operator in control of a selected processor to transmit, via said communications channel, changes to the controlled vocabulary dictionary of another processor.

3. The system of claim 1 wherein said controlled vocabulary dictionary includes sets of dictionary items, and said editing elements are adapted to receive commands from an operator to add to or delete items from an existing set of dictionary items, add a new set of dictionary items or delete an existing set of dictionary items.

4. The system of claim 1 wherein said controlled vocabulary dictionary includes a list of purchase items or action items for marketing and sales purposes including direct mail and telemarketing.

* * * * *